United States Patent [19]

Nakatani et al.

[11] Patent Number: 5,090,021
[45] Date of Patent: Feb. 18, 1992

[54] DISCHARGE EXCITING PULSE LASER DEVICE

[75] Inventors: Hajime Nakatani; Atsushi Sugitatsu, both of Hyogo, Japan

[73] Assignee: Mitsubishi Denki K.K., Tokyo, Japan

[21] Appl. No.: 523,688

[22] Filed: May 15, 1990

[30] Foreign Application Priority Data

May 17, 1989 [JP] Japan .................................. 1-123345

[51] Int. Cl.$^5$ .............................................. H01S 3/097
[52] U.S. Cl. ......................................... 372/86; 372/85; 372/38
[58] Field of Search ........................ 372/87, 86, 38, 85

[56] References Cited

U.S. PATENT DOCUMENTS

| | | | |
|---|---|---|---|
| 4,380,079 | 4/1983 | Cohn et al. | 372/86 |
| 4,613,971 | 9/1986 | Brumme et al. | 372/86 |
| 4,635,267 | 1/1987 | Cirkel et al. | 372/38 |
| 4,718,072 | 1/1988 | Marchetti et al. | 372/86 |
| 4,837,773 | 6/1989 | Wakata et al. | 372/86 |
| 4,975,921 | 12/1990 | Rothe | 372/38 |

OTHER PUBLICATIONS

Optics Communications, vol. 56, No. 1, Nov. 1, 1985, pp. 51, 52; S. V. Mel'Chenko et al., "High-Power Raman Conversion of a Discharge XeCl-Laser".
Review of Scientific Instruments, vol. 58, No. 2, Feb. 1987, pp. 261-264; G. C. Stuart et al.: "High Gain, Multiatmosphere $CO_2$ Laser Amplifier".
J. Appl. Phys., vol. 54, No. 10, Oct. 1983, pp. 5672-5675; R. Marchetti et al., "Optimization of Corona-Discharge Photoionization Sources for $CO_2$ Lasers".

Primary Examiner—Léon Scott, Jr.
Attorney, Agent, or Firm—Sughrue, Mion, Zinn, Macpeak & Seas

[57] ABSTRACT

A discharge exciting pulse laser device such as an exima laser device. The laser device is capable of accelerating the timing of rise of the voltage between an auxiliary electrode and one of main electrodes without decreasing a discharge start voltage between the main electrodes, so that the laser output power is increased and the laser oscillation efficiency is improved.

5 Claims, 3 Drawing Sheets

DISCHARGE EXCITING PULSE LASER DEVICE

BACKGROUND OF THE INVENTION

The present invention relates to a discharge exciting pulse laser device such as an eximer laser device. More particularly the invention relates to a pulse generator for use in a discharge exciting pulse laser device.

FIG. 1 is a circuit diagram showing a conventional eximer laser device described in "OPTICS COMMUNICATIONS", Vol. 56, No. 1, Nov. 1, 1985, p.51. In the figure, reference numeral 1 designates a laser chamber filled with a laser gas, such as XeCl, and containing electrodes and the like as described below. Reference numeral 2 designates a first main electrode with a convexly curved discharge surface; 3, a second main electrode made of a curved mesh metal, which is disposed facing the first main electrode 2; 4, an auxiliary electrode disposed within an concave portion of the second main electrode 3; 5, an insulating member disposed so as to cover the surface of the auxiliary electrode 4; 6, a charge terminal; 7, a charge resistor; 8, a switch including a spark gap whose one pole is connected to the second main electrode and is grounded; 9, a first charge capacitor coupled in series with a reactor 10 between the other pole of the switch 8 and the first main electrode 2; 11, a charge capacitor connected between the second main electrode 3 and a node of the first charge capacitor 9 and the reactor 10; 12 a second charge capacitor connected to the other pole of the switch 8 and the auxiliary electrode 4; 13, a peaking capacitor connected between the main electrodes 2 and 3; 14, a resistor as a first charge circuit element connected between the main electrodes 2 and 3; 15, a resistor as a second charge circuit element connected between the second main electrode 3 and the auxiliary electrode 4.

The operating of the pulse generator thus arranged will be described. A power source (not shown) is turned on to supply a DC voltage to the charge terminal 6. The voltage charges the capacitors 9, 11, and 12, through the charge resistor 7. Since the resistors 14 and 15 are connected between the electrodes, a satisfactory voltage is applied to the capacitors 9, 11, and 12.

The switch 8, the reactor 10, and the capacitors 9 and 11 constitute a conventional LC inverter. With the LC inverter, if the switch 8 at the spark gap after the charge is completed, the voltages appearing across the capacitors 9 and 11 are superposed one upon the other, as indicated by a waveform 1 in FIG. 2, and a high pulse voltage appears between the main electrodes 2 and 3. Simultaneously with the close of the switch 8, the second charge capacitor 12 also is discharged, and a pulse voltage as indicated by waveform 2 in FIG. 2 appears across between the second main electrode 3 and the auxiliary electrode 4.

The generation of the pulse voltage causes a corona discharge 16 to occur between the main electrode 3 and the auxiliary electrode 4. As a result, ultraviolet light due to the corona discharge pass through the second electrode 3 of the mesh structure so as to irradiate the gas in the space between the main electrodes 2 and 3. A preliminary ionization is caused in the space by the irradiation. The insulating member 5 is provided to for prevent the corona discharge from transforming 16 to an arc discharge.

As the crest or peak value of the pulse voltage between the main electrodes 2 and 3 increases, electrons generated through the preliminary ionization serve as seeds to cause impact ionization. Then, a main discharge 17 occurs between the main electrodes 2 and 3 resulting in the occurrence of a laser oscillation. The peaking capacitor 13 is provided to increase the peak value of the voltage between the main electrodes 2 and 3 due to its capacitor nature, or to increase the peak power to the main discharge 17.

If a rise of the voltage between the second main electrode 3 and the auxiliary electrode 4 is made quick, the preliminary ionization due to the corona discharge 16 is facilitated, as a result of which the main discharge 17 is more uniform and the laser output power is thus increased. The above fact has been disclosed in "J. Appl. Phys." 54(10), Oct. 1983, pp 5672 to 5675. The rising speed of the pulse voltage in the circuit of the auxiliary electrode 4 depends greatly on stray inductance components of the circuit. Particularly as for the stray inductance and resistance components at the terminal of the switch 8, the current of the circuit of the main discharge 17 may be allowed to flow thereinto. This results in a voltage drop, which in turn delays the rising of the voltage in the circuit of the corona discharge 16.

Accordingly, if the current flowing in the circuit of the main discharge 17 is restricted by increasing the reactance of the reactor 10, the rise of the voltage in the circuit of the corona discharge 16 is made proportionally rapid (see waveform 2 of FIG. 3).

With such a discharge exciting pulse laser device thus assembled, if the reactance of the reactor 10 is increased to facilitate the preliminary ionization by the corona discharge, the rise of the voltage pulse in the main discharge circuit becomes slow in speed as indicated by waveform 1 of FIG. 3. Accordingly, the V-t characteristic of the main discharge circuit causes the discharge start voltage $V_B$ to drop, and hence the injection energy is decreased. Consequently, the laser output cannot be increased.

SUMMARY OF THE INVENTION

In view of the above, an object of the present invention is to provide a discharge exciting pulse laser capable of accelerating the rise of the voltage between an auxiliary electrode and the second main electrode without decreasing the discharge start voltage between the main electrodes to thereby increase the laser output power.

In the discharge exciting pulse laser device according to the present invention, a saturable reactor is connected in series to a first charge capacitor, and after a switch is closed so that a voltage between the auxiliary electrode and the second main electrode has risen, the inductance of the saturable reactor is reduced.

By setting the reactance of the saturable reactor at a large value, it becomes possible to make the rise of the pulse voltage between the auxiliary electrode and the second main electrode sharply. After the pulse voltage has risen, the saturable reactor is saturated, so that the reactance (inductance) decreases nonlinearly. Accordingly, the rise of the pulse voltage between the electrodes is delayed little.

Additionally, a delay circuit is connected in series to the second charge capacitor. With the provision of the delay circuit, the leading edge of a pulse voltage applied between the auxiliary electrode and the second main electrode coincides with the leading edge of a pulse voltage applied between the main electrodes. The voltage applied between the main electrodes has risen before electrons which are generated by preliminary ionization due to corona discharge may decrease much. Accordingly, the effect of the preliminary ionization is applied effectively.

DESCRIPTION OF THE PREFERRED EMBODIMENTS

Figure 1:
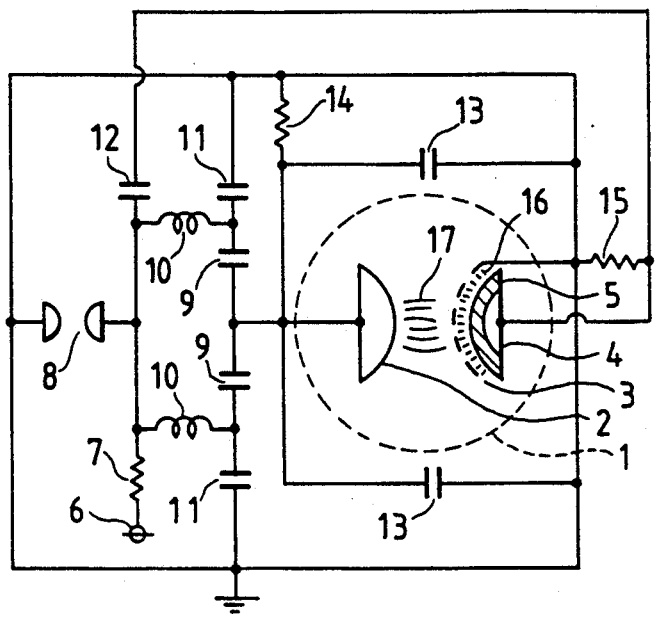
FIG. 1 is a circuit diagram showing a conventional eximer laser device.
Figure 4:
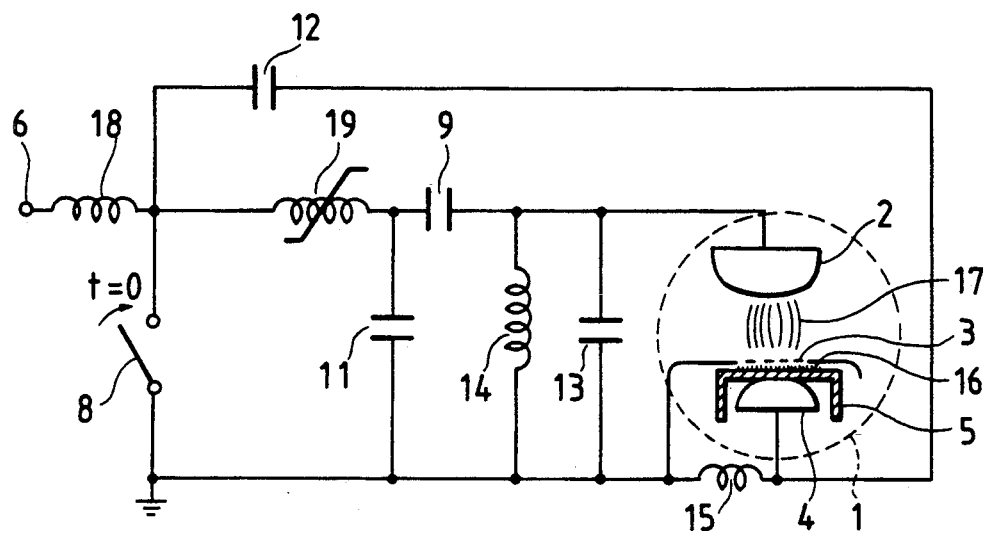
FIG. 4 is a circuit diagram showing an eximer laser device according to an embodiment of the present invention.

FIG. 4 is a circuit diagram showing an embodiment of an eximer laser device according to an embodiment of the present invention. In the figure, like reference symbols are used to designate like or equivalent portions in FIG. 1. Charge reactors are used for the charge circuit elements 14 and 15. Reference numeral 18 designates a charge reactor; 19 a saturable reactor, which is used instead of the reactor 10 of the conventional device.

Figure 3:
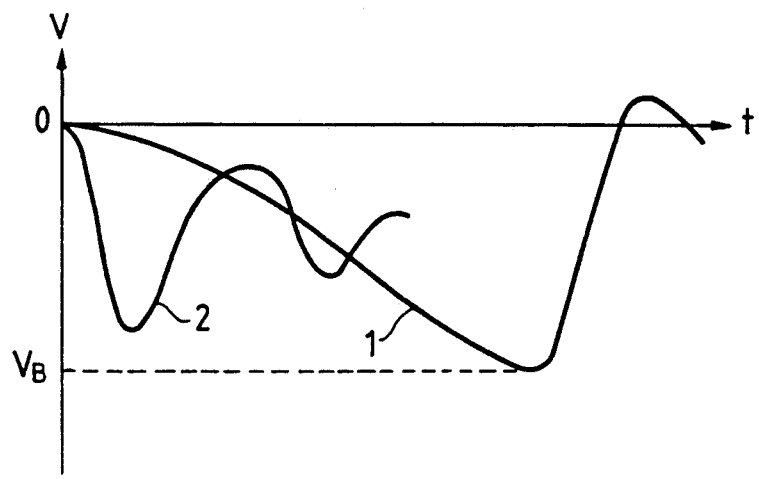
Figure 5:
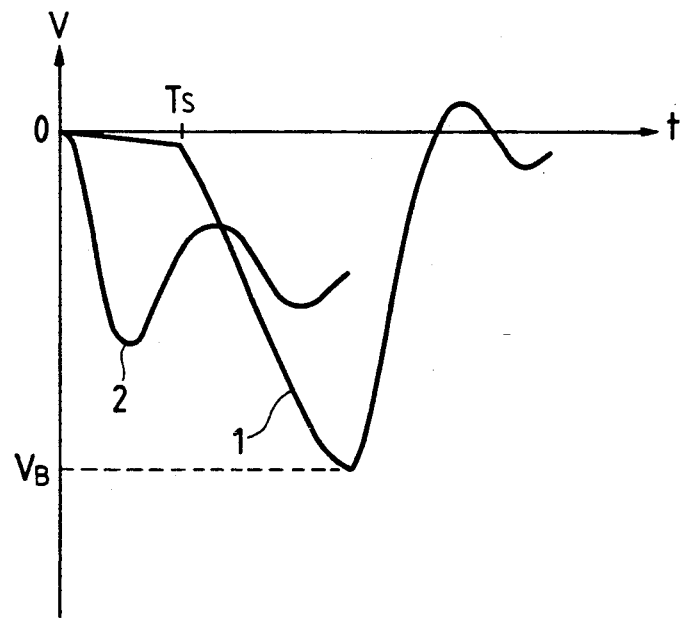
FIG. 5 is a graphical representation showing waveforms of the pulse voltages in the laser device.

In operation, as is similar to the conventional device, the capacitors 9, 11 and 12 are first charged through the charge reactor 18. During the course of the charging, an iron core of the saturable reactor 19 is saturated with one polarity. At time t=0, the is an arc across the gap of the switch 8. Upon the occurrence of arc, the capacitors 9, 11 and 12 start discharging. Since the direction of the current flowing through the saturable reactor 19 is now reverse to that of the current at the time of charging, the core becomes desaturated. As already described referring to FIG. 3, the saturable reactor 8 operates like a reactor having a large reactance. Under this condition, as shown in FIG. 5, the reactor 19 restricts the discharge of the first charge capacitor 9. The rise of the discharge of the second charge capacitor 12 becomes early and sharp, and the corona discharge 16 facilitates the preliminary ionization. Thus, the useful effects resulting from the increased reactance of the reactor 19 can be obtained as expected.

Figure 2:
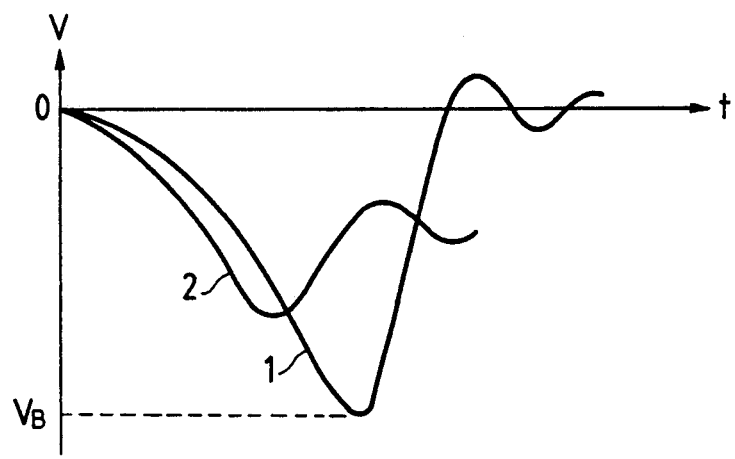
FIGS. 2 and 3 are graphic representations showing waveforms of the pulse voltages of the laser device of FIG. 1.

In FIG. 5, the discharge progresses and at time t=Ts, the core of the reactor 19 is saturated, so that its reactance decreases abruptly and nonlinearly. As a result, as indicated by the waveform 1, the rise of the pulse voltage between both the main electrodes 2 and 3 is determined by the sharply reduced inductance. Accordingly, as is similar to the conventional device of FIG. 2, the voltage rises quickly and the discharge start voltage B is, and the energy injected to the main discharge 17 is also increased.

The pulse voltage which rises sharply as indicated by the waveform 2 in FIG. 5, is applied across the auxiliary electrode 4 and the second main electrode 3. In turn, the corona discharge 16 occurs to cause a preliminary ionization between the main electrodes 2 and 3. In the case where a gas mixed with electron attractive gas, such as $F_2$ or HCl gas, is used for the laser gas with which the laser chamber (1) is filled (and where the $F_2$ gas is used), electrons generated during the preliminary ionization are attracted to the electron attractive gas resulting in a reduction in the effect of the preliminary ionization.

Figure 6:
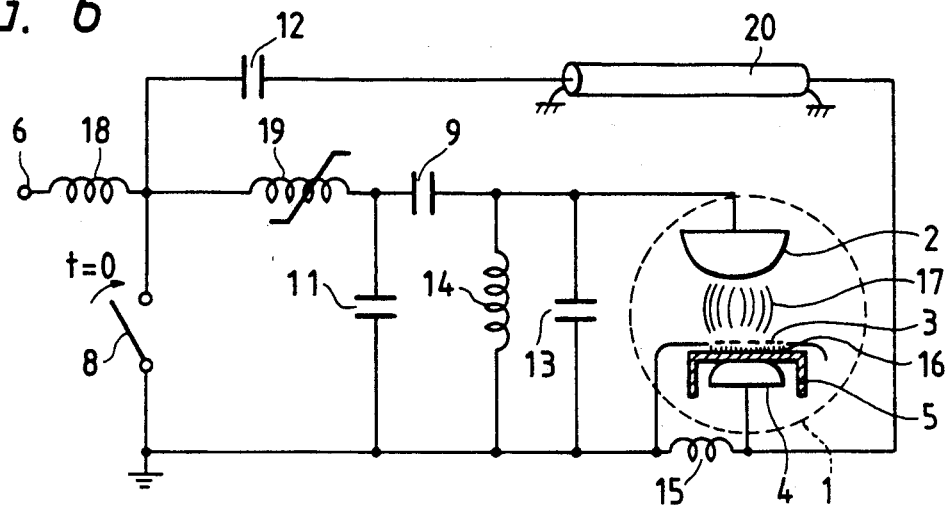
FIG. 6 is a schematic circuit diagram showing another embodiment of an eximer laser device according the present invention.

FIG. 6 is a circuit diagram of a discharge exciting laser device according to another embodiment of the present invention which is obtained by modifying the first embodiment to overcome the disadvantage just mentioned. The embodiment is different from the first embodiment of FIG. 4 in that a coaxial cable 20 serving as a delay circuit is connected in series with the second charge capacitor 12.

Figure 7:
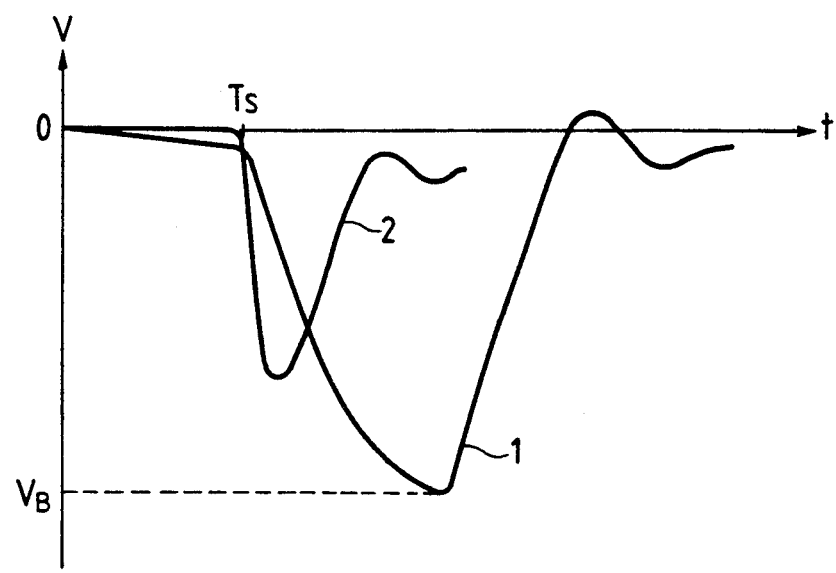
FIG. 7 is a graph showing waveforms of the pulse voltages in the laser device of FIG. 6.

FIG. 7 shows waveforms of the respective pulse voltages in the second embodiment. When compared with the waveform of FIG. 5, the delay circuit delays by about 40 ns the pulse voltage (waveform 2 in the figure) between the auxiliary electrode 4 and the second main electrode 3, while keeping the steep rise profile of the pulse voltage. As a result, the timing of the rising of the pulse voltage waveform 2 is coincident with the leading edge of the pulse voltage between the main electrodes 2 and 3. Therefore, the problem of absorbing electrons generated by the preliminary ionization due to the corona discharge is substantially removed. Shifting the corona discharge is smoothly performed to the main discharge.

Each of the embodiments mentioned above employs a so-called LC inverter using the charge capacitor 11 between the main electrodes 2 and 3 for the circuit for generating the pulse voltage. It should be noted that modification may be possible, and the capacitor 11 may be omitted, if necessary.

Figure 8:
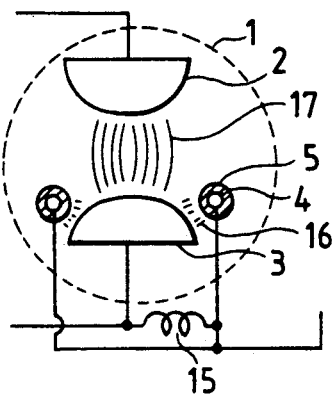
FIG. 8 shows a schematic illustration of an electrode structure of an additional embodiment of the present invention.

Another example of the electrodes is shown in FIG. 8. In the figure, the second main electrode 3 is shaped to have the same configuration of the first main electrode. Rod-shaped auxiliary electrodes 4 are disposed on either side of the second main electrode 3. Each auxiliary electrode 4 is covered with an insulating layer 5.

In this case, a corona discharge 16 is generated between the auxiliary electrodes 4 and the second main electrode 3. In turn, preliminary ionization occurs between the electrodes 2 and 3. Then, the corona discharge shifts to main discharge 17. This approach, therefore, may attain the effects comparable with those of the other embodiments.

While the spark gap switch is employed in the above described embodiments, it may be replaced by a switch such as a thyratron. The reactors 14 and 15 may be replaced by resistors or combinations of a reactor and a resistor that are connected in several manners. It is also evident that the present invention is applicable to any discharge exciting pulse laser device as well as the eximer laser device. The charge terminal 6 may be provided between the reactor 19 and the capacity 9, unless resetting of the reactor is adversely affected.

As is clear from the above description, according to the present invention, with the combination of the first charge capacitor and the saturable reactor, after the voltage for the corona discharge has risen, the inductance of the saturable reactor is reduced. Therefore, the voltages for both corona discharge and the main discharge can be caused to rise sharply, so that preliminary ionization is facilitated, the main discharge is uniform, and the injection energy for the discharge is increased. As a consequence, it is possible to increase the laser output power and the laser oscillation efficiency as well.

With the provision of the delay circuit connected to the second charge capacitor, the leading edge of the voltage for the corona discharge is coincident with that of the voltage for the main discharge. Therefore, the effect of the preliminary ionization by the corona discharge may be effectively utilized. The shift of the corona discharge to the main discharge can be thus made smooth resulting in, increase in the laser output power and an improvement in the laser oscillation efficiency.

What is claimed is:

1. A discharge exciting pulse laser device, comprising; first and second main electrodes across which is generated a main discharge, an auxiliary electrode cooperating with said second main electrode to generate a corona discharge, a switch having a first terminal connected to said second main electrode, a series circuit of a saturable reactor and a first charge capacitor connected between a second terminal of said switch and said first main electrode, a first charge circuit element connected between said main electrodes, a second charge capacitor for facilitating said corona discharge connected between the second terminal of said switch and said auxiliary electrode, and a second charge circuit element connected between said second main electrode and said auxiliary electrode, said first and second charge capacitors being charged with said switch turned-off, such that when said switch is turned-on after completion of charging said first and second charge capacitors a corona discharge is generated between said auxiliary electrode and said second main electrode and said corona discharge preliminarily ionizes a space between said main electrodes to cause said main discharge therebetween.

2. A discharge exciting pulse laser as defined in claim 1 further comprising a delay circuit connected in series with said second charging capacitor, so that a leading edge of a pulse voltage applied between said auxiliary electrode and said second main electrode coincides with a leading edge of a pulse voltage applied between said main electrodes.

3. A discharge exciting pulse laser as defined in claim 1 wherein said auxiliary electrode comprises a pair of rod-shaped members which are arranged in parallel near said second main electrode.

4. A discharge exciting pulse laser device, comprising; first and second main electrodes across which is generated a main discharge, an auxiliary electrode cooperating with said second main electrode to generate a corona discharge, a switch having a first terminal connected to said second main electrode, a series circuit of a saturable reactor and a first charge capacitor connected between a second terminal of said switch and said first main electrode, a first charge circuit element connected between said main electrodes, a second charge capacitor for facilitating said corona discharge connected between the second terminal of said switch and said auxiliary electrode, and a second charge circuit element connected between said second main electrode and said auxiliary electrode.

5. In a discharge exciting pulse laser device of the type including first and second main electrodes across which is generated a main discharge, and an auxiliary electrode cooperating with said second main electrode to generate a corona discharge, and wherein a switch having a first terminal is connected to said second main electrode, the improvement comprising a series circuit of a saturable reactor and a first charge capacitor connected between a second terminal of said switch and said first main electrode.

* * * * *